(12) United States Patent
Takizawa et al.

(10) Patent No.: US 7,626,660 B2
(45) Date of Patent: Dec. 1, 2009

(54) LIQUID CRYSTAL DISPLAY DEVICE HAVING MISALIGNED REFLECTORS

(75) Inventors: Keiji Takizawa, Nagano (JP); Tatsuya Kato, Nagano (JP)

(73) Assignee: Seiko Epson Corporation (JP)

( * ) Notice: Subject to any disclaimer, the term of this patent is extended or adjusted under 35 U.S.C. 154(b) by 388 days.

(21) Appl. No.: 11/214,174

(22) Filed: Aug. 29, 2005

(65) Prior Publication Data

US 2006/0044240 A1 Mar. 2, 2006

(30) Foreign Application Priority Data

Sep. 2, 2004 (JP) ............................. 2004-255390

(51) Int. Cl.
*G02F 1/1335* (2006.01)
*G02F 1/1343* (2006.01)

(52) U.S. Cl. .................... 349/114; 349/106; 349/113

(58) Field of Classification Search .................. 349/114
See application file for complete search history.

(56) References Cited

U.S. PATENT DOCUMENTS

| 6,501,521 | B2 | 12/2002 | Matsushita et al. | |
|---|---|---|---|---|
| 6,563,554 | B2 * | 5/2003 | Okamoto et al. | 349/12 |
| 6,885,418 | B2 | 4/2005 | Matsushita et al. | |
| 7,123,327 | B2 * | 10/2006 | Otake | 349/114 |
| 2002/0171791 | A1 * | 11/2002 | Anno et al. | 349/113 |
| 2004/0095528 | A1 * | 5/2004 | Nakamura et al. | 349/106 |
| 2006/0007374 | A1 | 1/2006 | Sone | |

FOREIGN PATENT DOCUMENTS

| CN | 1374551 | 10/2002 |
|---|---|---|
| JP | 2003-043239 | 2/2003 |
| JP | 2003-222851 | 8/2003 |
| JP | 2003-255324 | 9/2003 |
| JP | 2006-30255 | 2/2006 |

* cited by examiner

*Primary Examiner*—Andrew Schechter
(74) *Attorney, Agent, or Firm*—Harness, Dickey & Pierce, P.L.C.

(57) ABSTRACT

A liquid crystal display device includes a pair of substrates composed of a first substrate and a second substrate, which are disposed opposite to each other with a liquid crystal layer interposed therebetween; a plurality of pixels arranged in a matrix; reflective layers that are provided on the second substrate and reflects incident light from the first substrate side; a plurality of sub-pixels constituting each of the plurality of pixels; color filters on which colored layers having different colors are arranged, each of the colored layers corresponding to each of the sub-pixels; and an illumination unit provided at an outer surface side of the second substrate. The liquid crystal display device is a transflective liquid crystal display device for displaying images through a reflective region and a transmissive region, which are provided in each of the sub-pixels. The reflective region of each sub-pixel is a region for black and white display or monochrome gray-scale display, the transmissive region is a region for color display in the pixels, and reflectance of the reflective region of each sub-pixel is different for each of the sub-pixels having different colors.

6 Claims, 9 Drawing Sheets

LIQUID CRYSTAL DISPLAY DEVICE HAVING MISALIGNED REFLECTORS

RELATED APPLICATIONS

This application claims priority to Japanese Patent Application No. 2004-255390 filed Sep. 2, 2004 which is hereby expressly incorporated by reference herein in its entirety.

BACKGROUND OF THE INVENTION

1. Technical Field

The present invention relates to a liquid crystal display device and to an electronic apparatus.

2. Related Art

Reflection-type liquid crystal display devices, which have an advantage of low power consumption because of not having a light source, such as a backlight and the like, have been generally employed for additional display units to various portable electronic apparatuses and the like. However, since the reflection-type liquid crystal display devices display images using external light such as natural light, for example, sunlight or illumination light, there is a problem in that it is difficult for users to view displayed characters and the like on display units in a dark place.

In order to overcome such a disadvantage, a liquid crystal display device has been widely used to allow images to be viewed by observers using the external light in a light place like the general reflection-type liquid crystal display devices and using an internal light source such as a backlight or the like in a dark place. That is, this liquid crystal display device employs both the reflective and transmissive display modes, and thus by changing the display mode between the reflective and transmissive display modes depending on ambient brightness, it is possible to reduce power consumption and allows images to be clearly viewed even in dark places. Accordingly, the external light contributes to display of images in the reflective display mode while light emitted from an illumination unit such as the backlight (hereinafter, referred to as 'illumination light') contributes to display of images in the transmissive display mode.

Hereinafter, in the specification, such a liquid crystal display device is referred to as 'a transflective liquid crystal display device'.

In general, the transflective liquid crystal display device has a liquid crystal display panel including a pair of substrates and liquid crystal interposed between the pair of substrates, and an illumination unit provided at a side opposite to a side from which the liquid crystal display panel is observed and radiating light onto a substrate surface of the liquid crystal display panel. In addition, a reflective layer having a plurality of openings (transflective layer) is provided in a substrate located at the side opposite to the side from which the liquid crystal display panel is observed.

In addition, recently, with the development of portable electronic apparatuses or OA apparatuses, color liquid crystal display has been required and color display has been required for electronic apparatuses having the transflective liquid crystal display device.

As a transflective liquid crystal display device meeting such a requirement, a transflective liquid crystal display device having color filters has been suggested. In such a transflective liquid crystal display device, in a reflection mode, external light incident on the liquid crystal display device passes through the color filters, is then reflected by a reflecting plate, and then again passes through the color filters. In addition, in a transmission mode, light emitted from a backlight passes through the color filters. In addition, the same color filters are used in both the reflection mode and the transmission mode.

However, in the transflective liquid crystal display device, only one of the black and white display and the color display can be performed in either the reflection display mode or the transmission display mode. For example, in the case of a liquid crystal display device for use in a portable telephone, there is a problem in the lack of versatility, as in the case in which the black and white display can be performed in a standby mode (reflection display when the backlight is turned off) and the color display can be performed in an operation mode (transmission display when the backlight is turned on). In addition, in order to improve brightness and visibility of display, the amount of power supply of the backlight has to increase or the brightness and visibility of one of the reflection display and the transmission display must be sacrificed. Accordingly, there is a strong demand for a liquid crystal display device with improved brightness and high visibility without increasing the cost.

Accordingly, there has been proposed a liquid crystal display device including a reflection film having transmission holes through which light substantially passes and color filters constructed by colored layers provided in a region corresponding to the transmission holes on a substrate (for example, see Japanese Unexamined Patent Application Publication No. 2003-43239). The invention can provide a liquid crystal display device allowing the black and white display in the reflection display mode and the color display in the transmission display mode with improved brightness or visibility of display in the transmission display mode or the reflection display mode without increasing the cost.

Each of the color filters of the liquid crystal display device includes a reflective layer reflecting incident light such as external light, a transmission portion through which illumination light passes, and sub-pixels formed on the transmission portion and having respective colored layers of red (R), green (G), and blue (B). In addition, transmission portions provided on reflective layers of the sub-pixels have the same area for all sub-pixels corresponding to red (R), green (G) and blue (B), that is, the same aperture.

Accordingly, in the liquid crystal display device disclosed in Japanese Unexamined Patent Application Publication No. 2003-43239, the areas of the reflective layers of the sub-pixels corresponding to red (R), green (G), and blue (B) become equal. For this reason, when a display mode is switched from the transmission mode to the reflection mode, for example, if images such as characters of a primary color (one of R, G and B colors) are displayed on a background image of a primary color (one of R, G and B colors), the reflectance to the incident light for each of the sub-pixels having different colors is equal. As a result, no difference occurs in brightness at a boundary between the background image and the character images, and accordingly, it is difficult to distinguish the boundary between the background image and the character images, which results in deterioration of visibility for an observer in the reflection mode.

SUMMARY

An advantage of the invention is that it provides a liquid crystal display device with improved visibility, which is capable of distinguishing boundaries between pixels displaying different color images in both a transmission mode and a reflection mode, and an electronic apparatus having the liquid crystal display device.

According to one aspect of the invention, a liquid crystal display device includes a pair of substrates composed of a first substrate and a second substrate, which are opposite to each other with a liquid crystal layer interposed therebetween, a plurality of pixels arranged in a matrix, reflective layers provided on the second substrate and reflecting incident light from the first substrate side, a plurality of sub-pixels constituting each of the plurality of pixels, color filters on which colored layers having different colors are arranged, each of the colored layers corresponding to each of the sub-pixels, and an illumination unit provided at an outer surface side of the second substrate, the liquid crystal display device being a transflective liquid crystal display device for displaying images through a reflective region and a transmissive region, which are provided in each of the sub-pixels. The reflective region of each sub-pixel is a region for black and white display or monochrome gray scale display, the transmissive region is a region for color image display in the pixels, and the reflectance of the reflective region of each sub-pixel is different for each of the sub-pixels having different colors.

The liquid crystal display device provides a transflective liquid crystal display device for performing color display in a transmission display mode and black and white display or monochrome gray scale display in a reflection display mode. In the liquid crystal display device, a sub-pixel is a pixel of the minimum unit for driving the liquid crystal individually and corresponds to a region in which a pair of electrodes are opposite to each other with a liquid crystal layer interposed therebetween. In addition, a pixel (dot), which is the minimum unit of display of an image, is formed by a plurality of sub-pixels having different colors. In addition, the sub-pixel is prepared to correspond to two pixel electrodes and, for example, is formed in an overlapping portion of a pixel electrode provided on one of a pair of substrates and a pixel electrode provided on the other of the pair of substrates.

Conventionally, the reflectance of the reflective regions provided for the sub-pixels having different colors is equal for all sub-pixels. That is, incident light from a first substrate is reflected in all sub-pixels having different colors with the same reflectance and the reflected light is viewed by an observer at the first substrate side.

In such a case, for example, in the transmission display mode, it is assumed that each pixel among adjacent pixels displays an image through one of the sub-pixels having different colors. In the transmission display mode, since each pixel displays the image through each of the sub-pixels having different colors, there occurs a color difference and/or a brightness difference between adjacent pixels, so that the observer can distinguish a boundary between the adjacent pixels.

Here, for example, considering the black and white display, since colored layers are not present in the reflective regions, the black and white display is obtained in the reflection display mode. Accordingly, when each of the adjacent pixels displays the image through one of the sub-pixels having different colors, the reflective regions provided in the sub-pixels of each pixel have the same reflectance, and thus the amount of the reflected light emitted from the adjacent pixels becomes equal. Accordingly, since the brightness difference as well as the color difference between the adjacent pixels is not present, the observer cannot distinguish the boundary between the adjacent pixels.

On the contrary, since the reflectance in the reflective regions in the sub-pixels is set to be different for each of the sub-pixels having different colors, the amount of the reflected light emitted from the sub-pixels becomes different. Accordingly, in the reflection display mode, since the reflectance of the reflective regions of the sub-pixels of each pixel is different, the amount of the reflected light emitted from the adjacent pixels becomes different. Accordingly, there occurs a brightness difference between the adjacent pixels, and accordingly, the observer can distinguish the boundary between the adjacent pixels. In addition, in the transmission display mode for the color display like the conventional method, the observer can distinguish a color difference and/or a brightness difference between the adjacent pixels. Accordingly, in the invention, it is possible to secure the visibility of the observer in the reflection display mode as well as to distinguish the boundary between the adjacent pixels.

Preferably, an area of the reflective region of each sub-pixel is different for each of the sub-pixels having different colors by making an area of the reflective region of each sub-pixel be different for each of the sub-pixels having different colors.

With this configuration, since the area of the reflective region of each sub-pixel is different for each of the sub-pixels having different colors, the amount of light incident into the reflective regions of the sub-pixels having different colors is different. Accordingly, the amount of light reflected by the reflective regions of the sub-pixels can become different. Accordingly, there occurs a brightness difference between the adjacent pixels, and accordingly, the observer can distinguish the boundary between the adjacent pixels.

In addition, since the reflectance of the reflective regions of the sub-pixels can become different by changing areas of the reflective regions, it is easy to adjust the reflectance for each sub-pixel and a process is easily performed as compared to other units.

Preferably, areas of the sub-pixels are equal, and the reflectance of the reflective region of each sub-pixel is different for each of the sub-pixels having different colors by making an area of the reflective region for each sub-pixel be different for each sub-pixel as an area of the transmissive region for each sub-pixel is set to be different for each sub-pixel.

In general, areas of sub-pixels having different colors constituting a pixel are equal. Accordingly, according to this aspect, when the areas of the transmissive regions of the sub-pixels become different, the areas of the reflective regions become different. Accordingly, the boundary between the adjacent pixels can be distinguished, as mentioned above, and, a sensitivity characteristic close to the visibility of the observer can be obtained by, for example, making an area of a transmissive region of a sub-pixel corresponding to a color for which the observer has low visibility larger than areas of transmissive regions of the other sub-pixels.

Preferably, a light shielding portion corresponding to the reflective region of each sub-pixel is provided, and the reflectance of the reflective region of each sub-pixel is different for each of the sub-pixels having different colors by making an area of the reflective region different for each sub-pixel as an area of the light shielding portion provided for each sub-pixel is set to be different for each sub-pixel. In addition, preferably, the light shielding portion according to the liquid crystal display device includes a light shielding film or wiring lines provided between the sub-pixels.

With this configuration, since the area of the light shielding portion is set to be different for each of the sub-pixels having different colors, the areas of the reflective regions of the sub-pixels having different colors are different. In addition, the amount of reflected light reflected by the reflective regions of the sub-pixels becomes different. Accordingly, there occurs a brightness difference between the adjacent pixels, and accordingly, the observer can distinguish the boundary between the adjacent pixels.

Preferably, unevenness is provided in the reflective layer of each sub-pixel, and the reflectance of the reflective region of each sub-pixel is different for each of the sub-pixels having different colors by making a degree of scattering of light reflected by the unevenness provided in the reflective layer of each sub-pixel be different for each of the sub-pixel having different colors.

With this configuration, when a degree of scattering of the reflected light by the unevenness of the sub-pixels is high, since the reflected light is weakly reflected in a specular reflection direction, the reflectance of the incident light is high and the amount of light emitted to the observer becomes large. On the other hand, when the degree of scattering of the reflected light by the unevenness of the sub-pixels is low, the reflected light is strongly reflected in the specular reflection direction, so that the reflectance of the incident light is low and the amount of light emitted to the observer becomes small. Accordingly, the amount of reflected light reflected by the reflective regions of the sub-pixels having different colors can become different by making the degree of scattering of reflected light reflected by the unevenness provided in the reflective layers of the sub-pixels having different colors different. Accordingly, there occurs a brightness difference between the adjacent pixels, and accordingly, the observer can distinguish the boundary between the adjacent pixels.

Preferably, openings are provided in reflective layers of at least two sub-pixels, and the reflectance of the reflective region of each sub-pixel is different for each of the sub-pixels having different colors by making areas of the openings of at least two sub-pixels different.

In general, each of the sub-pixels having different colors has a structure where reflective layers made of metal or the like are provided on a substrate. According to this aspect, openings are provided in the reflective layers, and, the incident light passes through the second substrate without being reflected in a region in which the openings are provided in the reflective layers. Accordingly, by providing the openings in the reflective layers and making the reflectance of the reflective regions of the sub-pixels different, the amount of reflected light in the sub-pixels can become different. Accordingly, there occurs a brightness difference between the adjacent pixels, and accordingly, the observer can distinguish the boundary between the adjacent pixels.

Preferably, a spacer for defining a cell gap is provided such that the spacer overlaps the reflective layers of at least two sub-pixels, and the reflectance of the reflective region of each sub-pixel is different for each of the sub-pixels having different colors by making an occupied area of the spacer in each sub-pixel be different for each sub-pixel.

With this configuration, the spacer is maintained between the first substrate and the second substrate and the liquid crystal layer is not present in a portion in which the spacer is provided. Accordingly, for example, if the spacer is made of a transparent material, the light incident from the first substrate side passes through the spacer, is reflected by the reflective layers on the second substrate, and is emitted again to the first substrate. Accordingly, by increasing or decreasing the number of spacers, the reflectance of the reflective regions provided in the sub-pixels can become different.

Preferably, a filter that adjusts the intensity of incident light is provided in at least two sub-pixels, and the reflectance of the reflective region of each sub-pixel is different for each of the sub-pixels having different colors by making an occupied area or light transmissivity of the filter in each sub-pixel be different for each sub-pixel.

In this case, since a filter that adjusts the amount of incident light is provided in at least one sub-pixels, the amount of light incident on a sub-pixel having the filter can become different from the amount of light incident on the other sub-pixels. In addition, the amount of reflected light reflected by the reflective regions of the sub-pixels having different colors becomes different. Accordingly, there occurs a brightness difference between the adjacent pixels, and accordingly, the observer can distinguish the boundary between the adjacent pixels.

Preferably, the colored layer having different colors are provided to correspond to red (R), green (G), and blue (B), and the reflectance of the reflective layers of the sub-pixels having different colors of red (R), green (G), and blue (B) is high in the order of a green (G) sub-pixel, a red (R) sub-pixel, and a blue (B) sub-pixel.

In general, the sub-pixels of red (R), green (G), and blue (B) have the same area. In addition, for the observer, blue light emitted from a sub-pixel corresponding to blue (B) is weaker in sensitivity characteristic than green light emitted from a sub-pixel corresponding to green (G).

According to this aspect, the reflectance of the reflective regions of the sub-pixels corresponding to red (R), green (G), and blue (B) is set such that the reflectance of the reflective region of the sub-pixel corresponding to green (G) is larger than the reflectance of the reflective region of the sub-pixel corresponding to red (R) and the reflectance of the reflective region of the sub-pixel corresponding to red (R) is smaller than the reflectance of the reflective region of the sub-pixel corresponding to blue (B). Accordingly, there additionally occurs a brightness difference between the adjacent pixels, and accordingly, the observer can distinguish the boundary between the adjacent pixels. In addition, it is possible to secure the visibility of the observer in the reflection display mode and obtain the sensitivity characteristic close to the visibility of the observer.

Further, according another aspect of the invention, there is provided an electronic apparatus including the above-mentioned liquid crystal display device.

According to this aspect, since the electronic apparatus includes the liquid crystal display, the electronic apparatus with high visibility and improved display quality can be achieved.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
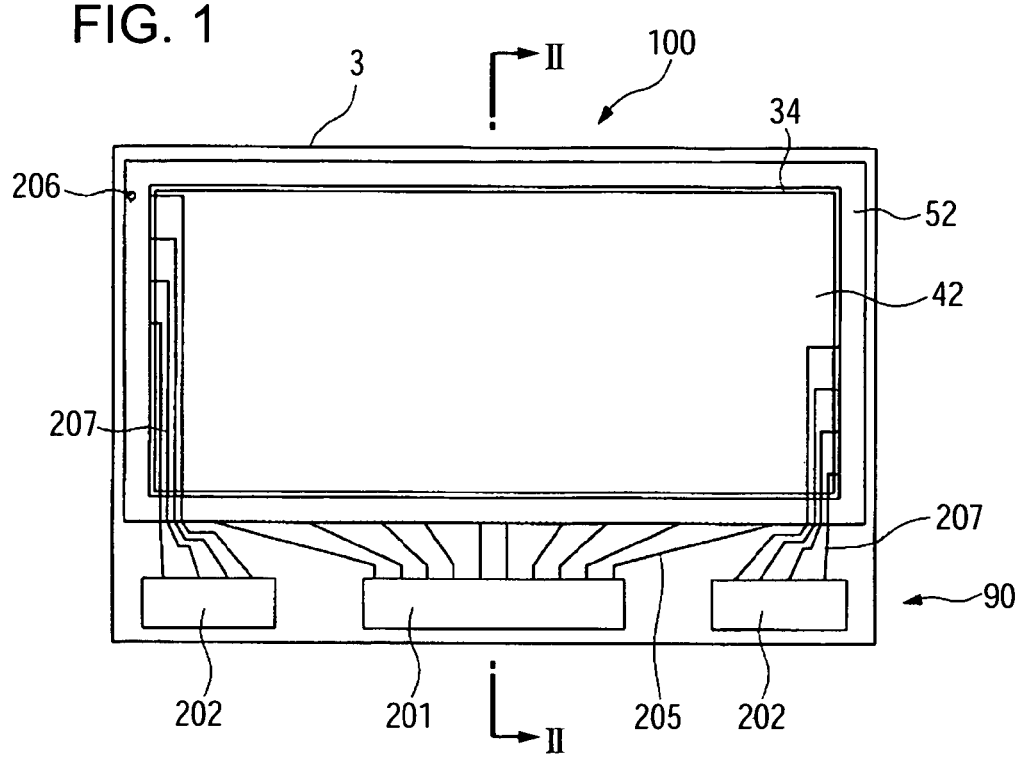
FIG. 1 is a plan view schematically illustrating a liquid crystal display device according to the invention.

Hereinafter, embodiments as best modes of the invention will be described with reference to the accompanying drawings. The scale of each layer or member has been adjusted in order to have a recognizable size in the drawings.

First Embodiment

Now, a first embodiment of the invention will be described with reference to the drawings.

Electro-Optical Device

FIG. 1 is a plan view schematically illustrating the structure of a liquid crystal display device according to the first embodiment of the invention. The electro-optical device according to this embodiment is a transflective electro-optical device including a transmissive display mode in which incident light from a backlight (not shown) is transmitted to display images and a reflective display mode in which incident light from an observer side is reflected to display images. In addition, this embodiment employs an active-matrix-type liquid crystal display device using thin Film diodes (TFDs), which are non-linear elements of a two-terminal type, as switching elements.

As shown in FIG. 1, a liquid crystal display device 100 according to this embodiment includes a pair of a first substrate 3 and a second substrate 2 (not shown in FIG. 1) bonded by means of an ultraviolet curable sealant 52, and liquid crystal 4 with which a region defined by the sealant 52 is filled. The sealant 52 is formed with a closed rectangular loop shape (frame shape) in a substrate surface and does not have a liquid crystal inlet. Specifically, the sealant 52 is constructed with a continuous loop shape of a single material without the liquid crystal inlet sealed with a sealing material. Alternatively, it is possible to use the sealant with the liquid crystal inlet sealed with a sealing material.

Conductive particles 206 (conductive portions between substrates) for making an electrical contact between the first substrate 3 and the second substrate 2 are contained in portions of the sealant 52 of the rectangular loop shape along the right and left sides (two opposite sides) of the first substrate 3 shown in FIG. 1. Anisotropic conductive particles are used as the conductive particles 206.

In addition, in the present embodiment, while the first substrate 3 is larger than the second substrate 2 and edges (end surfaces of the substrates) of three sides (top, right and left sides in FIG. 1) of the second substrate 2 and the first substrate 3 are sequentially arranged, an edge of the first substrate 3 extends from one remaining side (bottom side in FIG. 1) of the second substrate 2 to form an extension region 90.

On the extension region 90 are mounted a first diving IC 201 for driving pixel electrodes formed at the first substrate 3 side, which will be described below, and second diving ICs 202 for driving data lines formed at the second substrate 2 side, which will be described below. In addition, the respective driving ICs 201 and 202 have external connection terminals (not shown) for receiving display control signals and the like from external devices other than the liquid crystal display device 100.

All the first driving IC 201 and the second driving ICs 202 are arranged on the first substrate 3 and are formed in the same extension region 90 of the first substrate 3 of a rectangular shape. The first driving IC 201 is an IC for transmitting signals to TFD elements 515 (see FIG. 4) and further pixel electrodes 513 through signal lines formed at the first substrate 3 side. These signals are supplied via wiring lines 205 formed on the first substrate 3.

Since the second driving ICs 202 are formed on the first substrate 3 and are ICs for transmitting signals to data lines 527 formed on the second substrate 2, these signals are supplied to the data lines 527 through layout wiring lines 207 formed on the first substrate 3 and further the conductive particles 206 formed in the sealant 52. Here, the layout wiring lines 207 cross over a bottom side of the sealant 52 shown in FIG. 1 and are then connected to the conductive particles 206 from an inner side of the sealant 52.

Here, the conductive particles 206 are constructed using anisotropic conductive particles and are arranged in a vertically elastic deformation manner in order to ensure electrical connection in a vertical direction. The conductive particles 206 preferably have a diameter in the range of 0.1 to 1.0 μm larger than a diameter of a spacer (not shown) defining a thickness of a liquid crystal layer and may be compressed to 1 to 10% in the vertical direction before the substrates are bonded together.

In addition, in the liquid crystal display device 100, retardation plates, polarizing plates and the like are arranged in a predetermined direction depending on kinds of the liquid crystal 4 to be used, that is, operation modes, such as a TN (twisted nematic) mode, an STN (super twisted nematic) mode, a VAN (vertical aligned nematic) mode, or a normally white mode/normally black mode, which will be omitted in the disclosure.

Figure 2:
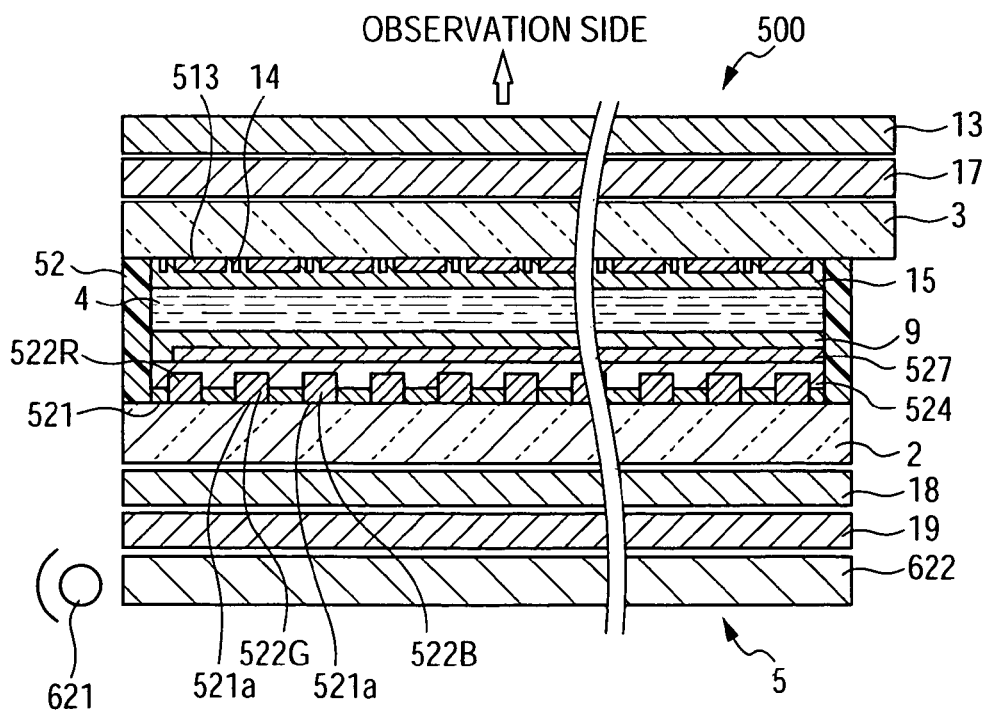
FIG. 2 is a cross-sectional view illustrating the structure of the liquid crystal display device of FIG. 1.
Figure 3:
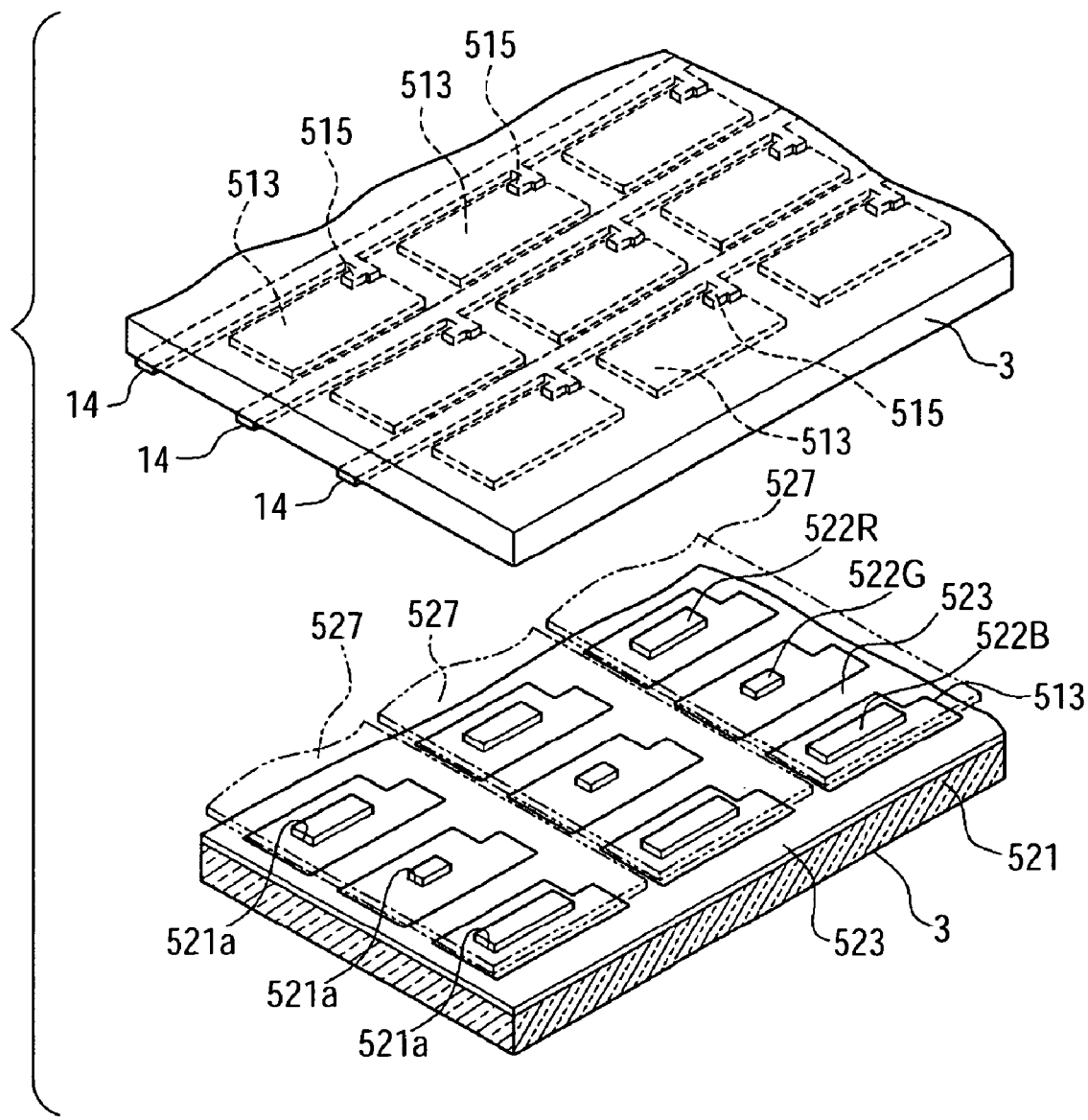
FIG. 3 is a perspective view illustrating a main portion of a liquid crystal display panel.
Figure 4:
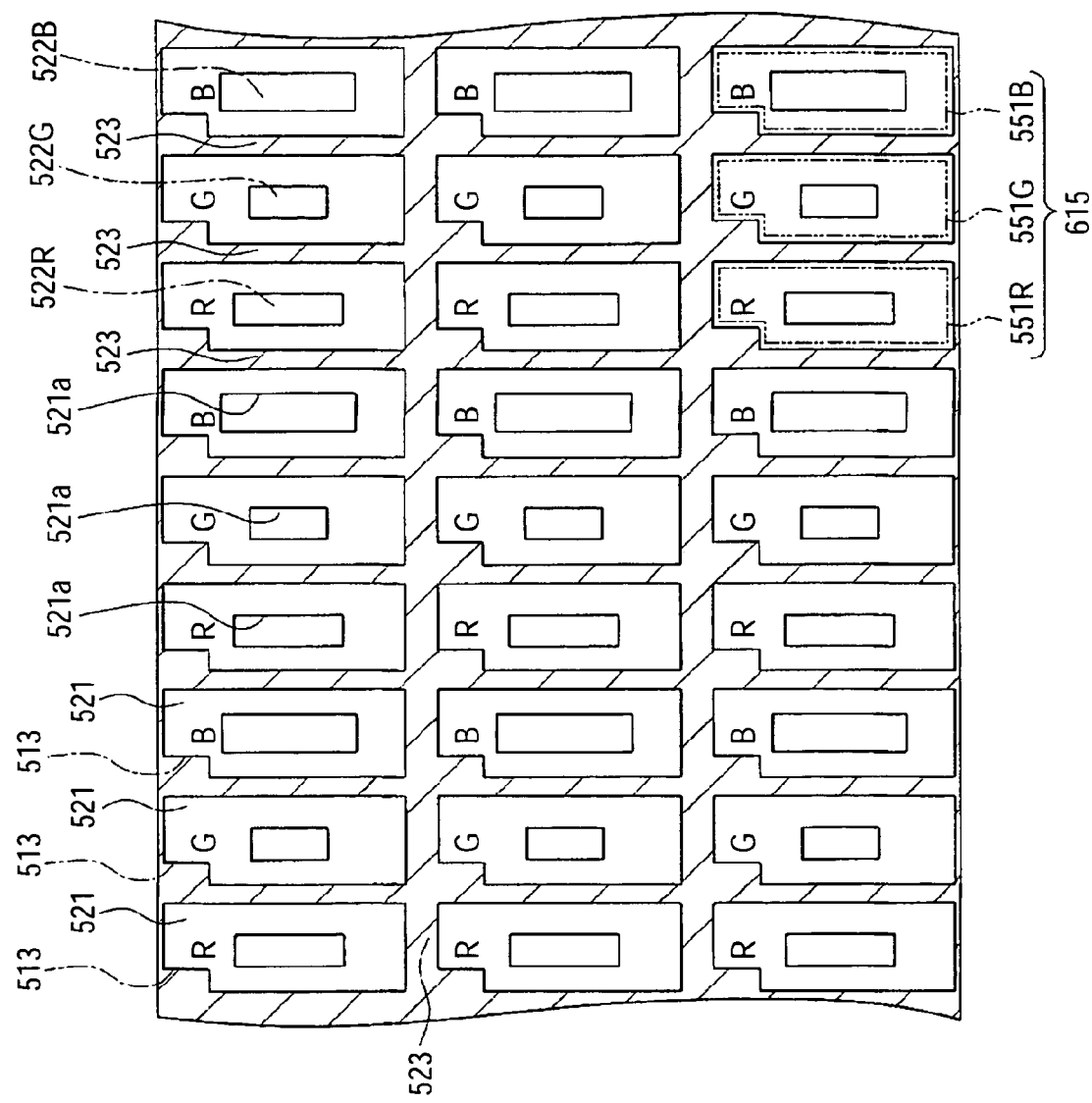
FIG. 4 is a plan view illustrating reflection regions of sub-pixels according to a first embodiment of the invention.

FIG. 2 is a cross-sectional view taken along the line II-II' of the liquid crystal display device 100 shown in FIG. 1. FIG. 3 is an exploded perspective view illustrating main portions of the first substrate 3 and the opposite second substrate 2 of the liquid crystal display panel 100 shown in FIG. 2. FIG. 4 is an enlarged plan view of a surface of the second substrate 2 of the liquid crystal display device 100 shown in FIG. 3. In addition, in FIG. 2, a black matrix is omitted for the sake of understanding of this embodiment.

As shown in FIGS. 2 and 3, the liquid crystal display device 100 has a liquid crystal display panel (liquid crystal panel) 500 including the pair of the first substrate 3 and the second substrate 2 bonded together through a sealant 52 and the liquid crystal (liquid crystal layer) 4 interposed between the pair of the substrates 3 and 2, and a backlight 5 (illumination unit) provided at the second substrate 2 side of the liquid crystal display panel 500. In the following description, as shown in FIG. 1, a side opposite to the backlight 5 with respect to the liquid crystal display panel 500 is mentioned as an 'observing side'. That is, the 'observing side' refers to a side at which an observer viewing images displayed by the liquid crystal display device is positioned.

The first substrate 3 and the second substrate 2 of the liquid crystal display panel 500 are formed of a light transmitting plate-shaped member, such as glass, quartz, plastic or the like.

The backlight 5 includes a plurality of LEDs 621 (only a single LED is shown in FIG. 2) and a light guide plate 622. The plurality of LEDs 621 are arranged opposite a lateral end surface of the light guide plate 622 and emits light to the lateral end surface. The light guide plate 622 is a plate-shaped member for uniformly guiding the light, which is incident on the lateral end surface from the LEDS 621, to a substrate surface of the liquid crystal display panel 500 (a surface of the second substrate 2). In addition, a diffusion plate and the like for uniformly diffusing light, which is emitted from the light guide plate 622, throughout the liquid crystal display panel 500 are attached to one side of the light guide plate 622, which faces the liquid crystal display panel 500, and, a reflection plate for reflecting light, which directs from the light guide plate 622 to the side opposite to the liquid crystal display panel 500, to the liquid crystal display panel 500 side is attached to the other side of the light guide plate 622 (both plates are not shown in the figures).

As shown in FIGS. 2 and 3, on an inner surface of the first substrate 3 are formed a plurality of pixel electrodes 513 arranged in a matrix and a plurality of scanning lines 14 adjacent to each of the pixel electrodes 513 and extending in a predetermined direction (a direction perpendicular to a paper in FIG. 2). Each pixel electrode 513 is made of a transparent conductive material such as ITO or the like and is formed by a deposition process or the like. In addition, as shown in FIG. 3, each pixel electrode 513 is formed to correspond to each position of sub-pixels R (red), G (green) and B (blue), which will be described below, of the second substrate 2 opposite to the first substrate. In addition, each pixel electrode 513 is connected to a corresponding scanning line 14, which is adjacent to the pixel electrode 513 and provided in a stripe shape, via a corresponding TFD element 515. Here, each TFD element 515 is a two-terminal switching element having a non-linear current-voltage characteristic.

In addition, as shown in FIG. 2, on an inner surface of the first substrate 3 including the pixel electrodes 513 and the scanning lines 14 is formed an alignment film 15 to cover the pixel electrodes 513 and the scanning lines 14. The alignment film 15 is an organic thin film such as polyimide and is subjected to a rubbing process for defining an alignment direction of the liquid crystal 4 when a voltage is not applied.

On the other hand, as shown in FIGS. 2 and 3, on an inner surface of the second substrate 2 are formed reflective regions in which reflective layers 521 are present and transmissive regions 521a in which the reflective layers 521 are not present. In addition, in this embodiment, as shown in FIG. 4, a region opposite to each pixel electrode 513 and each data line 527 becomes a sub-pixel 551 (more specifically, sub-pixels 551R, 551G, and 551B corresponding to respective colored layers 522R, 522G and 522B). In addition, a pixel (dot) 615 serving as a minimum unit of a display image is defined by three sub-pixels 551R, 551G, and 551B having different colors.

The reflective layers 521 are made of, for example, s light reflective metal material such as aluminum (Al) and are formed by a photolithography process and an etching process. In addition, as shown in FIGS. 2 and 3, the reflective layers 521 correspond to positions of respective pixel electrode 513 of the first substrate 3 and are arranged in a matrix on the inner surface of the second substrate 2. In addition, as shown in FIG. 3, the reflective layers 521 are formed in a rectangular shape like the pixel electrodes 513 and have the same area in shape. Accordingly, by making areas of the transmissive regions 521a provided on the reflective layer 521 different, areas of the reflective layers 521 can be set to be different. In addition, it is preferable to form a pattern of a plurality of unevenness on surfaces of the reflection layers 521 in order to improve diffusibility of light incident from the observing side.

In addition, the transmissive regions 521a for transmitting the light emitted from the backlight 5 are formed on the reflective layers 521. Specifically, openings of, for example, a rectangular shape are formed in roughly central portions of the rectangular reflection layers 521. These openings constitute the transmissive regions 521a. Accordingly, in this embodiment, the transmissive regions 521a are provided in the regions in which the reflective layers 521 are not present such that the transmissive regions do not overlap the reflective layers 521. The transmissive regions 521a are formed by performing the same patterning process as used for the reflection layers 521, and then a photolithography process and an etching process.

In addition, the openings of the transmissive regions 521a may be formed on the reflective layer 521 formed on the second substrate 2 such that the surface of the second substrate 2 is exposed, or may be preferably formed by forming a film thickness of the reflective layers 521 in the transmissive regions 521a to be so small that the light emitted from the backlight 5 passes through the reflective layers 521.

The colored layers 522R, 522G and 522B are composed of colors of R (red), G(green), and B (blue), which are three primary colors for color display. Here, the colored layer 552R, colored layer 552G, and colored layer 552B correspond to R (red), G (green) and B (blue), respectively. The colored layers 522R, 522G and 522B are formed in a predetermined pattern on the transmissive regions 521a of the second substrate 2 corresponding to relevant colors by an inkjet method using R (red), G (green) and B (blue) color resin pigments or the like. In addition, as shown in FIGS. 2 and 3, the colored layers 522R, 522G and 522B are formed in the transmissive regions 521a provided on the reflective layers 521 of the sub-pixels 551R, 551G, and 551B corresponding to respective colors. That is, the colored layers 522R, 522G and 522B are not formed in principle on the reflective layers 521. In addition, the colored layers 522R, 522G and 522B are formed in a specific pattern of arrangement such as a stripe shape, a mosaic shape, a delta shape or the like in plan view. In addition, when the colored layers 522 are formed by applying a colored material by the inkjet method or the like, the colored layers 522 are formed on the entire surface of the transmissive regions 521a, so that a portion of the colored layers 522 may overlap the reflective layers 521.

A black matrix 523 (light shielding film) is formed in gap portions of the plurality of reflective layers 521 arranged in a matrix. The black matrix 523 is formed by patterning materials, such as acryl resin or polyimide, in a matrix shape by a photolithography process and an etching process. In this manner, the black matrix 523 is formed to partition the reflection layers 521 (sub-pixels) and blocks light passing through regions which cannot control display of peripheral portions of the pixel electrodes 513.

Subsequently, the reflective regions of the reflective layers 521 of the sub-pixels 551R, 551G, and 551B will be described in detail with reference to FIG. 4.

FIG. 4 is a plan view of a plurality of sub-pixels arranged in a matrix on the second substrate 2.

As shown in FIG. 4, the reflective regions of the reflective layers 521 of the sub-pixels 551R, 551G, and 551B are formed such that an area of the reflective region of the sub-pixel 551G is larger than an area of the reflective region of the sub-pixel 551R and an area of the reflective region of the sub-pixel 551R is larger than an area of the reflective region of the sub-pixel 551B. Specifically, the areas of the reflective regions of the sub-pixels 551R, 551G, and 551B (assuming that the sum of the area of the reflective regions and the area of the transmissive regions 521a is 100) have an area ratio of 55% for the sub-pixel 551G, an area ratio of 50% for the sub-pixel 551R, and an area ratio of 45% for the sub-pixel 551B. Since the areas of the reflective regions of the sub-pixels 551R, 551G, and 551B are fixed, the area of each reflective region can be adjusted by making the areas of the transmissive regions 521a provided in the reflective regions different. That is, the areas of the reflective regions are changed as the areas of the transmissive regions 521a are changed. Accordingly, in the present embodiment, the area ratio of the transmissive regions 521a of the sub-pixels 551R, 551G, and 551B is 45% for the sub-pixel 551G, 50% for the sub-pixel 551R, and 55% for the sub-pixel 551B.

Here, in this embodiment, the area ratio of the reflective regions of the reflective layers 521 of the sub-pixels is set based on visual sensitivity of an observer of the liquid crystal display device 100. For example, general observers have different sensitivity characteristics for light emitted from the sub-pixels 551R, 551G, and 551B of the liquid crystal display device 100. Specifically, for the observers, the sensitivity characteristic for blue light emitted from the sub-pixel 551R is poorer than the sensitivity characteristic for green light emitted from the sub-pixel 551G. Accordingly, as described above, the reflective regions of the reflective layers 521 of the sub-pixels 551R, 551G, and 551B are formed such that the area of the reflective region of the sub-pixel 551G is larger than the area of the reflective region of the sub-pixel 551R and the area of the reflective region of the sub-pixel 551R is larger than the area of the reflective region of the sub-pixel 551B.

As described above, according to this embodiment, the areas of the reflective regions can be set to be different for each of the sub-pixels 551R, 551G, and 551B having different colors and, at the same time, the areas of the transmissive regions 521a can be set to be different for each of the sub-pixels 551R, 551G, and 551B having different colors depending on the visibility of the observers. Accordingly, it is possible to distinguish between boundaries of a plurality of pixels, thereby securing the visibility of the observers and obtaining the sensitivity characteristics close to the visual sensitivity of the observers.

Referring to FIG. 2 again, an overcoat layer 524 is formed on an inner side of the second substrate including the reflective layers 521 having the transmissive regions 521a and the colored layers 522R, 522G and 522B to cover the reflective layers 521 and the colored layers 522R, 522G and 522B. In addition, a plurality of data lines 527 (electrodes) made of a transparent conductive material are formed on the top surface of the overcoat layer 524. In more detail, as shown in FIG. 3, the data line 527 is formed to have a width in a lengthwise direction of each of sub-pixels 551R, 551G, and 551B and extend in a direction intersecting the scanning line 14 of the first substrate 3. In addition, the pixel electrode 513 of the first substrate 3 and the data line 527 of the second substrate 2 are arranged opposite to each other and form a pair of electrodes. With such a configuration, when a voltage is applied between the pixel electrode 513 on the first substrate 3 and the data line 527 on the second substrate 2, an alignment state of the liquid crystal 4 interposed between the pixel electrode and the data line is changed. In addition, an alignment film 9 is formed on the data line 527. The alignment film 9 is an organic thin film made of polyimide or the like and is subjected to a rubbing process for specifying an alignment direction of the liquid crystal 4 when a voltage is not applied.

In addition, as shown in FIG. 2, on an outer surface of the first substrate 3, a retardation plate 17 and an upper polarizing plate 13 are laminated on the first substrate 3 in this order.

On the other hand, a ¼ wavelength plate 18 and a lower polarizing plate 19 is provided on an outer surface of the second substrate 2.

Next, the TFD elements 515 connected to the scanning lines 14 of the first substrate 3, the data lines 527 of the second substrate 2 and the like of the liquid crystal display device 100 shown in FIGS. 1 and 4 will be described using an equivalent circuit.

Figure 5:
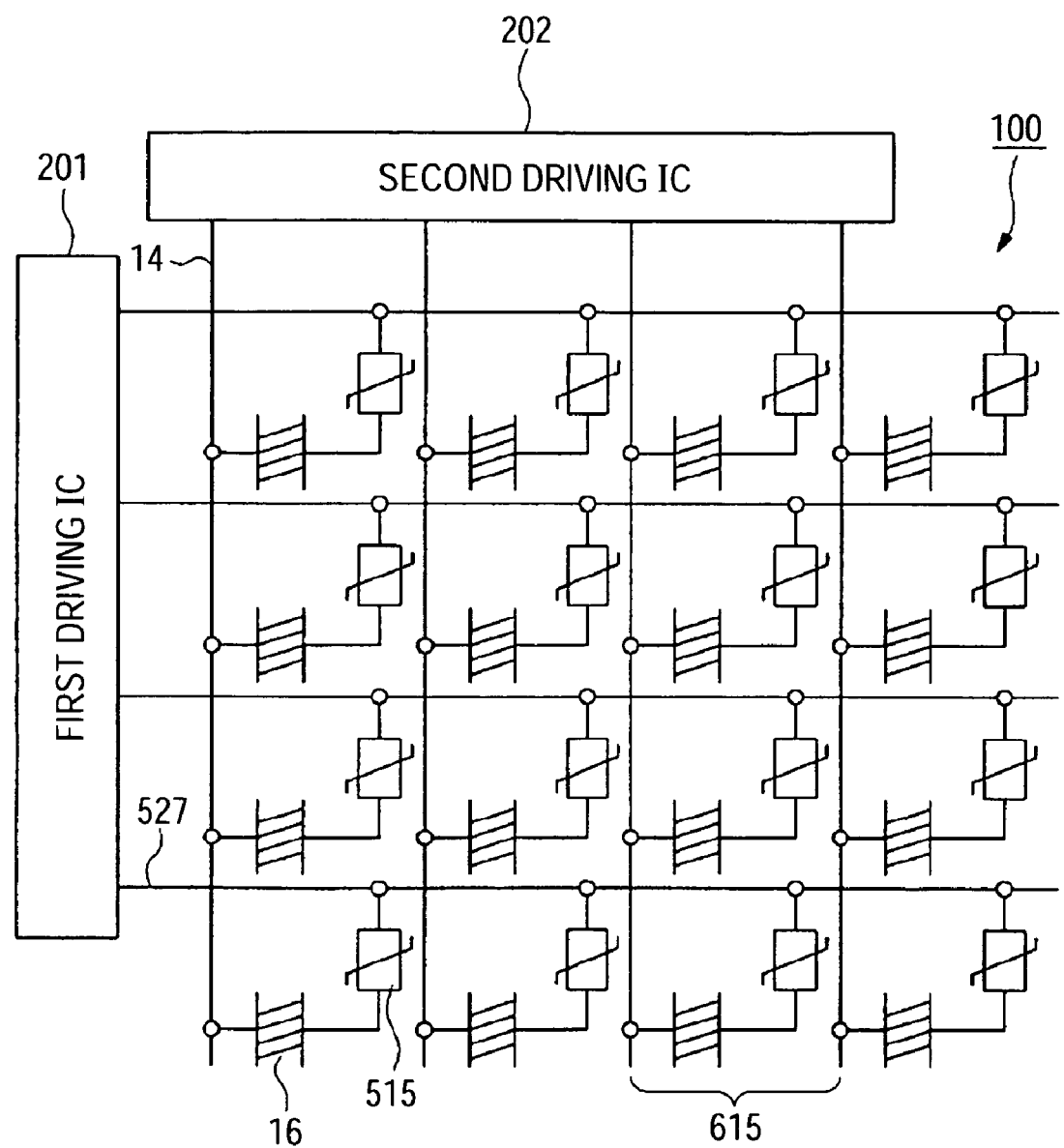
FIG. 5 is an equivalent circuit diagram of the liquid crystal display device of FIG. 1.

As shown in FIG. 5, the plurality of pixels 615 are formed in the matrix in the image display region of the liquid crystal display device 100. In addition, the liquid crystal display device 100 includes a first driving IC 201, a second driving IC 202, a plurality of scanning lines 14 (corresponding to counter electrodes 23), and a plurality of data lines 527 intersecting the plurality of scanning lines 14. The data lines 527 supply signals from the first driving IC 201 to each pixel 615 and the scanning lines 14 supply signals from the second driving IC 202 to each pixel 615. In addition, for each pixel 615, the TFD element 515 and a liquid crystal display element 16 (liquid crystal layer) are connected in series between the data line 527 and the scanning line 14. In addition, the TFD element 515 is connected to the data line 527 and the liquid crystal display element 16 is connected to the scanning line 14 in FIG. 2. However, conversely, the TFD element 515 may be connected to the scanning line 14 and the liquid crystal display element 16 is connected to the data line 527.

With the circuit configuration as described above, driving of the liquid crystal display element 16 is controlled based on a switching characteristic of the TFD element 515, and brightness is represented for each pixel 615 based on the driving of the liquid crystal display element 16 and images are displayed in a display region DSP of the liquid crystal display device 100.

Next, a display method for reflection-type display and transmission-type display of the liquid crystal display device 100 will be described.

If the liquid crystal display device 100 displays images in a transmission display mode, first, light is emitted from the backlight 5 and is incident on the second substrate 2. The light incident on the second substrate 2 is colored with a certain color by passing through the transmissive region 521a of the reflective layer 521 and then a certain colored layer 522. Then, the incident light colored with the certain color passes through the overcoat layer 524, the data line 527, the alignment film 9, the liquid crystal 4, the pixel electrode 513 of the first substrate 3, and the first substrate 3, and is then emitted to the observer. In this manner, as the light emitted from the backlight 5 passes through the pair of the first substrate 3 and the second substrate 2, the light colored with the certain color is emitted and viewed as color display by the observer.

On the other hand, if the liquid crystal display device 100 displays images in a reflection display mode (that is, the backlight 5 is turned off), external light such as sunlight or indoor illumination at an observer side is incident from the first substrate 3 side and passes through the pixel electrode 513 of the first substrate 3, an alignment film 15, the liquid crystal layer 4, the alignment film 9, the data line 527, and the overcoat layer 524 and is then incident on the reflective layer 521 formed on the second substrate 2. The light incident on the reflective layer 521 is reflected by the reflective layer 521 toward the first substrate 3 through the same path as the incidence path of light. In addition, the incident light is incident on the reflective layer 521 and simultaneously the colored layer 522 provided on the reflective layer 521. The transmissive region 521a exists immediately below the colored layer 522. For this reason, the incident light passes through the second substrate 2 without being reflected to the observing side. In this manner, as the incident light such as the external light is reflected by the reflective layer 521 of the second substrate 2, white light is emitted to the observing side and is viewed as black and white display by the observer.

As described above, the liquid crystal display device 100 according to the present embodiment can display color images in the transmission display mode (that is, when the backlight is turned on) and display black and white images in the reflection display mode (that is, when the backlight is turned off).

Subsequently, with the liquid crystal display device 100 as described above, the visibility of the observer when a pixel 615 in a red color display region displays a red color image and a pixel 615 in a green color display region displays a green color image will be comparatively described using a liquid crystal display device according to a conventional method and the liquid crystal display device according to this embodiment.

First, a case where a liquid crystal display device according to the conventional method is used will be described.

In the liquid crystal display device, areas of reflective layers formed for each of a plurality of sub-pixels R, G and B of the second substrate are approximately equal, and areas of transmissive regions provided on the reflective layers are also approximately equal.

In this liquid crystal display device, in the transmission display mode, since the light emitted from the backlight passes through only the sub-pixel R in a red color display region, the observer perceives a red (R) image in the red color display region. Similarly, the observer perceives a green (G) image in a green color display region.

Subsequently, in the reflection display mode, since the backlight is turned off and light does not pass through the transmissive region 521a and the colored layer in the red color display region, colored light is not emitted from the sub-pixels R, G and B to the observing side. On the other hand, since the TFD elements formed on the first substrate are turned on in the sub-pixel R, the incident light such as the external light is reflected by the reflective layer to be emitted to the observing side. At this time, since the emitted light is not colored, it becomes white light and the sub-pixel R becomes a white display region. Since the TFD elements formed on the first substrate are turned off in the other sub-pixels G and B, the incident light such as the external light cannot pass through a liquid crystal layer corresponding to the sub-pixels G and B. Accordingly, the incident light such as the external light is not reflected and these sub-pixels become a black display region.

Similarly, since the backlight is turned off in a green color display region, light is not emitted to the observing side. On the other hand, the incident light, such as the external light, is reflected by the reflective layer of the sub-pixel G to be emitted to the observing side.

In the reflection display mode of the conventional liquid crystal display device, since the area of the reflective layer in the red color display region is equal to the area of the reflective layer in the green color display region, the amount of light emitted from the sub-pixel R in the red color display region becomes equal to the amount of light emitted from the sub-pixel G in the green color display region. Accordingly, the amount of reflected light emitted from the red color display region is equal to the amount of reflected light emitted from the green color display region. For this reason, the observer may not perceive a boundary between the red color display region and the green color display region.

Next, a case where the liquid crystal display device according to present embodiment is used will be described.

As shown in FIG. 5, the liquid crystal display device according to this embodiment is different from the conventional liquid crystal display device in that the areas of the reflective layers 521 formed in the plurality of sub-pixels 551 of the second substrate 2 are approximately equal and the areas of the transmissive regions 521a provided on the reflective layers 521 are set to be different for each of the sub-pixels 551R, 551G, and 551B. In addition, the former is different from the latter in that the transmittance of light passing through the transmissive region 521a is different for each sub-pixel 551 in the transmissive display mode. Except for these differences, the liquid crystal display device according to this embodiment has the same configuration as the conventional liquid crystal display device, and the description thereof will be omitted.

In the reflection display mode, like the conventional liquid crystal display device, the incident light such as the external light is reflected by the reflective layer 521 in the sub-pixel 551R to be emitted to the observing side. At this time, since the emitted light is not colored, it becomes white light and the sub-pixel 551R becomes a white display region. Since the incident light such as the external light is not reflected in the other sub-pixels 551G and 551B, these sub-pixels 551G and 551B become a black display region.

Similarly, in the green color display region, the incident light such as the external light is reflected by the reflective layer 521 in the sub-pixel 551G to be emitted to the observing side. At this time, since the emitted light is not colored, it becomes white light and the sub-pixel 551G becomes a white display region. Since the incident light such as the external light is not reflected in the other sub-pixels 551R and 551B, these sub-pixels 551R and 551B become a black display region.

Here, in the liquid crystal display device 100 according to the present embodiment, as described above, the area of the reflective region of the sub-pixel 551R in the red color display region is smaller than the area of the reflective region of the sub-pixel 551G in the green color display region. Accordingly, when the amount of light incident on the sub-pixels 551R, 551G, and 551B is equal, the amount of light emitted from the reflective layer 521 of the sub-pixel 551R in the red color display region becomes smaller than the amount of light emitted from the reflective layer 521 of the sub-pixel 551G in the green color display region. Accordingly, in the reflection display mode, there occurs a difference in brightness between adjacent red and green color display regions and the observer can distinguish a boundary between the red color display region and the green color display region to ensure the visibility.

Second Embodiment

Next, a liquid crystal display device according to a second embodiment of the invention will be described with reference to the drawings.

The liquid crystal display device according to the second embodiment is different from that of the first embodiment in that the reflectance of the reflective layers 521 of the sub-pixels 551R, 551G, and 551B becomes different for the respective sub-pixel 551R, 551G, and 551B by changing an area of the black matrix 523 partitioning the sub-pixels 551. Except for this difference, the liquid crystal display device of the second embodiment has the same basic configuration as that of the first embodiment. In the second embodiment, the same elements as the first embodiment are denoted by the same reference numerals, and the description thereof will be omitted.

Figure 6:
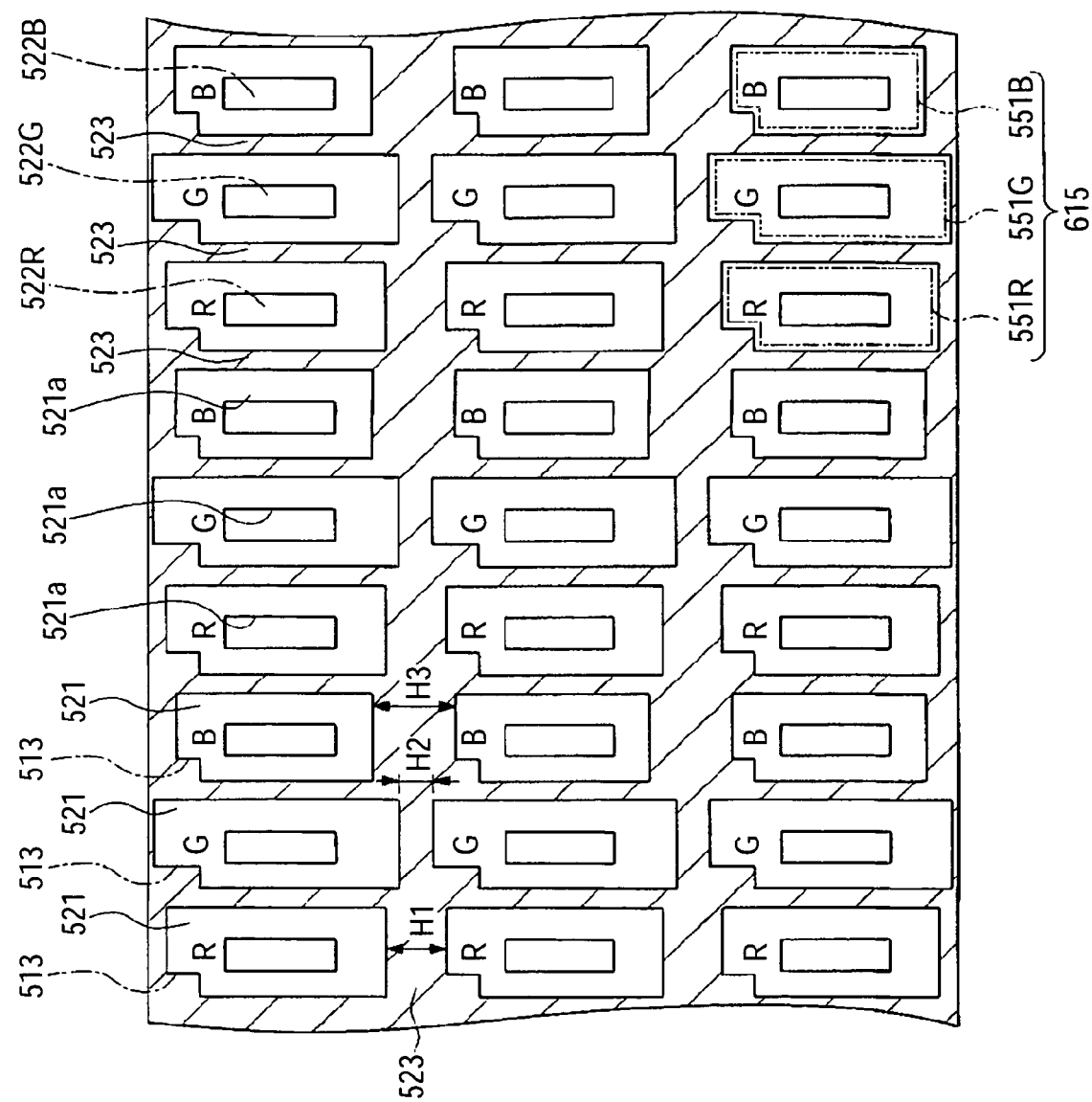
FIG. 6 is a plan view illustrating reflection regions of sub-pixels according to a second embodiment of the invention.

FIG. 6 is a plan view of a plurality of sub-pixels 551 arranged in a matrix on the second substrate 2.

As shown in FIG. 6, the sub-pixels 551R, 551G, and 551B are regularly arranged on the second substrate 2 in order. In addition, these sub-pixels 551R, 551G, and 551B are formed at a predetermined gap and black matrixes 523 are formed in gap portions of the sub-pixels 551R, 551G, and 551B.

As shown in FIG. 4, the reflective regions of the reflective layers 521 of the sub-pixels 551R, 551G, and 551B are formed such that the area of the reflective region of the sub-pixel 551G is larger than the area of the reflective region of the sub-pixel 551R, and the area of the reflective region of the sub-pixel 551R is larger than the area of the reflective region of the sub-pixel 551B.

In the second embodiment, the areas of the reflective regions of the sub-pixels 551R, 551G, and 551B are set by making areas of the black matrixes 523 partitioning the reflective layers 521 of the sub-pixels 551R, 551G, and 551B different. For example, the areas of the reflective regions of the sub-pixels 551R, 551G, and 551B can be adjusted by expanding and contracting a width H of the black matrix 523 in the gap portion between adjacent sub-pixels 551 and 551 in a lengthwise direction of the sub-pixels 551. Specifically, a width H2 of the black matrix 523 between the sub-pixels 551G and 551G is set to be smaller than a width H1 of the black matrix 523 between the sub-pixels 551R and 551R. Similarly, the width H1 of the black matrix 523 between the sub-pixels 551R and 551R is set to be smaller than a width H3 of the black matrix 523 between the sub-pixels 551B and 551B.

In addition, it is preferable to set an area ratio of the reflective regions of the reflective layers 521 of the sub-pixels 551 depending on the visual sensitivity of the observer. In addition, it is also preferable to make the area ratio of the reflective regions of the reflective layers 521 of the sub-pixels 551 different for each sub-pixel irrespective of the visual sensitivity of the observer. In addition, it is also preferable to make the areas of the reflective regions different by adjusting a width of the black matrix 523 between adjacent sub-pixels in a short side direction of the sub-pixels.

According to the second embodiment, the areas of the reflective regions of the sub-pixels 551 can be set to be different without making the areas of the transmissive regions 521a provided on the reflective layers 521 of the sub-pixels 551 different. Accordingly, in the transmission display mode, when intensity of peak wavelengths of red (R), green (G) and blue (B) light having spectral characteristics, which is emitted from the backlight 5 used, is equal, the visibility of the observer can be secured without deteriorating color reproducibility in display of images.

Third Embodiment

Next, a liquid crystal display device according to a third embodiment of the invention will be described with reference to the drawings.

The liquid crystal display device according to the third embodiment is different from that of the first embodiment in that the reflectance of the reflective layers 521 of the sub-pixels 551R, 551G, and 551B becomes different for each of the sub-pixels R, G and B by forming unevenness on the reflective layers 521 corresponding to the sub-pixels 551R, 551G, and 551B. Except for this difference, the liquid crystal display device of the third embodiment has the same basic configuration as that of the first embodiment. In the third embodiment, the same elements as the first embodiment are denoted by the same reference numerals, and the description thereof will be omitted.

Figure 7:
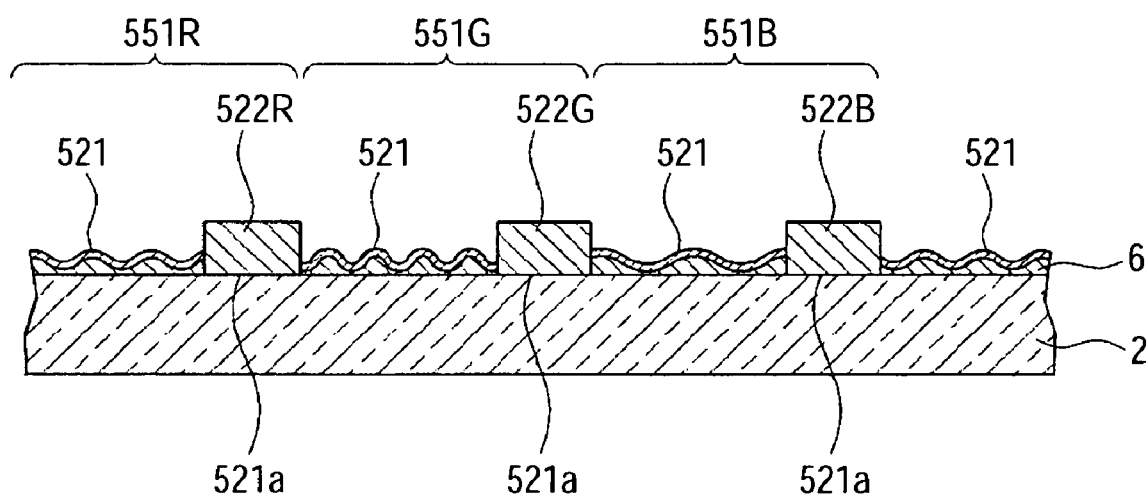
FIG. 7 is a cross-sectional view illustrating reflection regions of sub-pixels according to a third embodiment of the invention.

FIG. 7 is a cross-sectional view of a plurality of sub-pixels 551 arranged in a matrix on the second substrate 2.

As shown in FIG. 7, the reflective regions in which the reflective layers 521 are present and the transmissive regions 521a in which the reflective layers 521 are not present are formed on the second substrate 2 for each of the sub-pixel 551R, 551G, and 551B. In addition, the colored layers 522R, 522G and 522B are formed on the transmissive regions 521a of the sub-pixel 551R, 551G, and 551B, respectively.

In the third embodiment, as shown in FIG. 7, the reflective layers 521 are formed on a resin layer 6 having unevenness formed thereon with a predetermined pitch. For this reason, similarly, the reflective layers 521 formed on the resin layer 6 have unevenness according to the unevenness of the resin layer 6. Here, the pitch of the unevenness formed on the reflective layers 521 of the sub-pixels 551R, 551G, and 551B is different for each of the sub-pixels 551R, 551G, and 551B. Specifically, the pitch of the unevenness of the sub-pixels 551G is smaller than that of the unevenness of the sub-pixels 551R and the pitch of the unevenness of the sub-pixels 551R is smaller than that of the unevenness of the sub-pixels 551B.

According to the third embodiment, for the sub-pixel 551G having a small pitch of the unevenness, since the incident light has a high degree of scattering and is strongly reflected in a specular reflection direction, the reflectance of the incident light becomes high and the amount of light emitted to the observer side increases. On the other hand, if the pitch of the unevenness is larger than the sub-pixel 551G, since the incident light has a low degree of scattering and is strongly reflected in a specular reflection direction, the reflectance of the incident light becomes low and the amount of light emitted to the observer side decreases. Accordingly, by forming the unevenness on the reflective layers 521 of the sub-pixels 551R, 551G, and 551B, it is possible to make a degree of scattering of reflected light for the sub-pixels 551R, 551G, and 551B different. Further, in the reflection display mode, there occurs a difference in brightness between adjacent pixels 615 and accordingly the observer can distinguish a boundary between the adjacent pixels.

Fourth Embodiment

Next, a liquid crystal display device according to a fourth embodiment of the invention will be described with reference to the drawings.

The liquid crystal display device according to the fourth embodiment is different from that of the first embodiment in that the reflectance of the reflective layers 521 of the sub-pixels 551R, 551G, and 551B becomes different for each of the sub-pixel 551R, 551G, and 551B by forming openings 20, which are different from the openings of the transmissive regions 521a, on the reflective layers 521 of the sub-pixels. Except for this difference, the liquid crystal display device of the fourth embodiment has the same basic configuration as that of the first embodiment. In the fourth embodiment, the same elements as the first embodiment are denoted by the same reference numerals, and the description thereof will be omitted.

Figure 8:
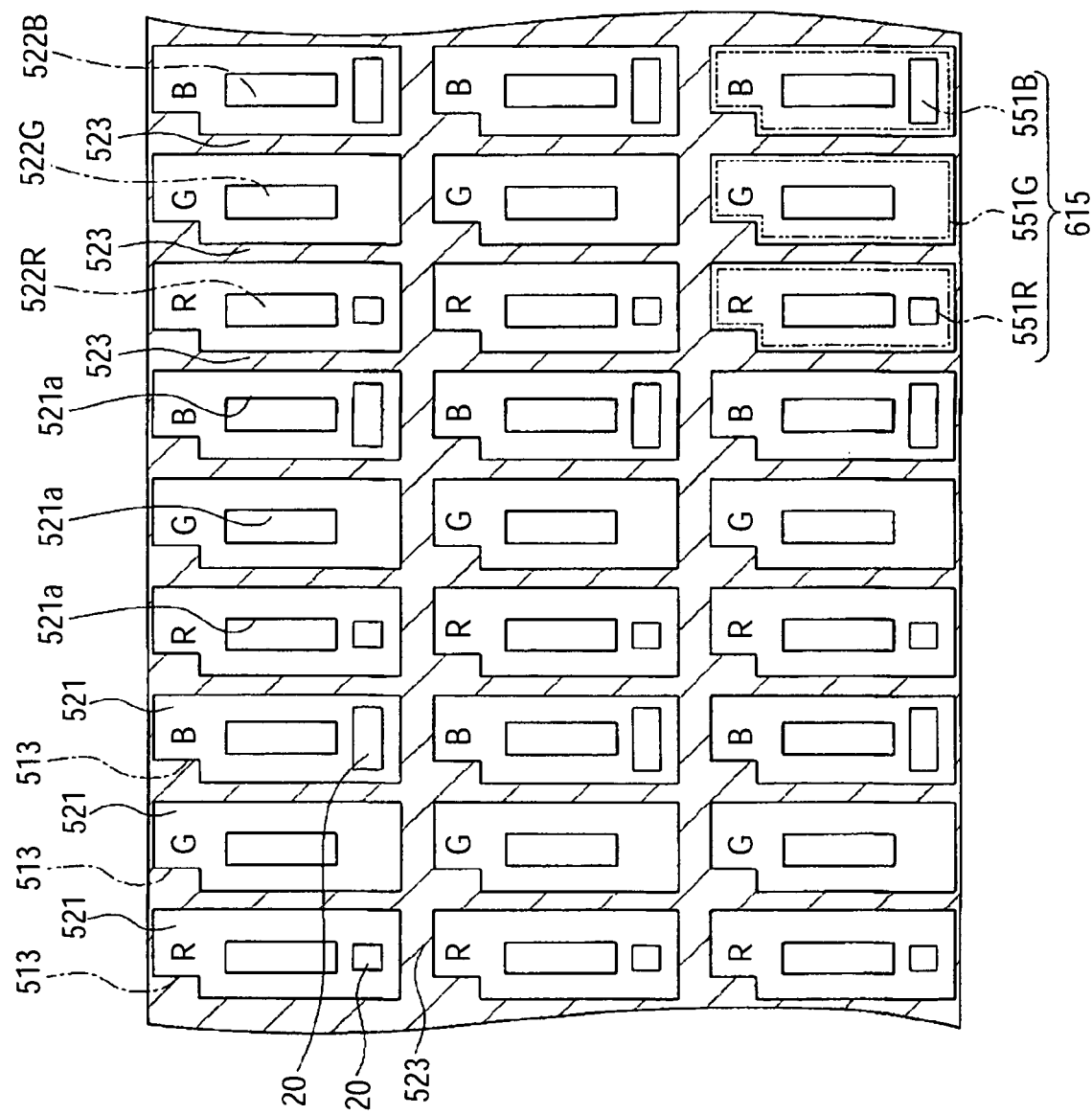
FIG. 8 is a plan view illustrating reflection regions of sub-pixels according to a fourth embodiment of the invention.

FIG. 8 is a plan view of a plurality of sub-pixels 551 arranged in a matrix on the second substrate 2.

As shown in FIG. 8, the sub-pixels 551R, 551G, and 551B are regularly arranged on the second substrate 2 in order. The reflective regions of the reflective layers 521 of the sub-pixels 551R, 551G, and 551B are formed such that the area of the reflective region of the sub-pixel 551G is larger than the area of the reflective region of the sub-pixel 551R, and the area of the reflective region of the sub-pixel 551R is larger than the area of the reflective region of the sub-pixel 551B.

The areas of the reflective regions of the sub-pixels are set to be different by forming the openings 20 in the reflective layers 521 of the sub-pixels. Specifically, the areas of the reflective regions of the sub-pixels are set to be different by removing a portion of the reflective layers 521 made of metal such as Al or the like and then forming the openings 20 in the reflective layers 521. Accordingly, the areas of the reflective regions of the sub-pixels 551 in which the openings 20 are formed can become small.

As shown in FIG. 8, an area of the opening 20 formed in the reflective region of the sub-pixel 551B is larger than an area of the opening 20 formed in the reflective region of the sub-pixel 551R. On the other hand, the opening 20 is not formed in the reflective region of the sub-pixel 551G. Accordingly, as described above, the area of the reflective region of the sub-pixel 551G can become larger than the area of the reflective region of the sub-pixel 551R, and the area of the reflective region of the sub-pixel 551R can become larger than the area of the reflective region of the sub-pixel 551B. As a result, the reflectance of the reflective regions can become different for each of the sub-pixels 551R, 551G, and 551B. In addition, the colored layers 522R, 522G and 522B are not formed on the openings 20 formed in the reflective regions, unlike the transmissive regions 521a. In addition, the openings 20 formed in the reflective regions of the sub-pixels 551R, 551G, and 551B can be formed at any positions with the reflective regions and it is preferable to form a plurality of openings 20 in each reflective region of each sub-pixel.

According to the fourth embodiment, like the second embodiment, the areas of the reflective regions of the sub-pixels 551R, 551G, and 551B can be set to be different without making the areas of the transmissive regions 521a provided on the reflective layers 521 of the sub-pixels 551R, 551G, and 551B different. Accordingly, in the transmission display mode, when intensity of peak wavelengths of red (R), green (G) and blue (B) light having spectral characteristics, which is emitted from the backlight 5 used, is equal, the visibility of the observer can be secured without deteriorating color reproducibility in display of images.

Fifth Embodiment

Figure 9:
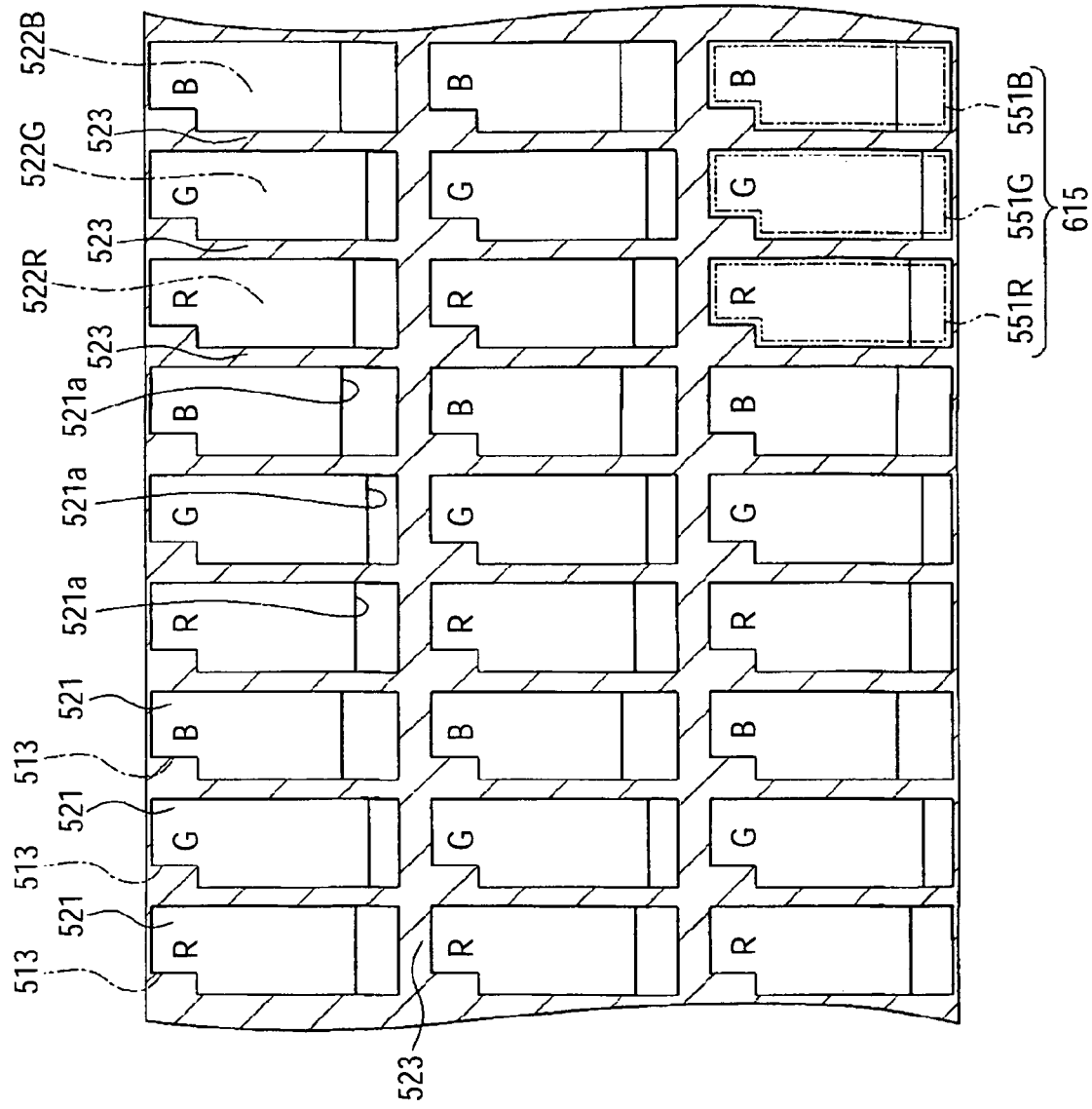
FIG. 9 is a plan view illustrating reflection regions of sub-pixels according to a fifth embodiment of the invention.

A liquid crystal display device according to a fifth embodiment is different from that of the first embodiment in that the reflectance of the reflective layers 521 of the sub-pixels 551R, 551G, and 551B becomes different for each sub-pixel 551R, 551G, and 551B by changing positions of the transmissive regions 521a provided on the reflective layers 521 of the sub-pixels 551R, 551G, and 551B. In a modification, the openings of the transmissive regions 521a are formed below the reflective layers 521 of the sub-pixels 551R, 551G, and 551B in FIG. 9.

In addition, by providing a plurality of openings in the transmissive region 521a provided on the reflective layer 521 of each of the sub-pixel 551R, 551G, and 551B, it is possible to make the reflectance of the reflective layers 521 of the sub-pixel 551R, 551G, and 551B different.

Electronic Apparatus

Figure 10:
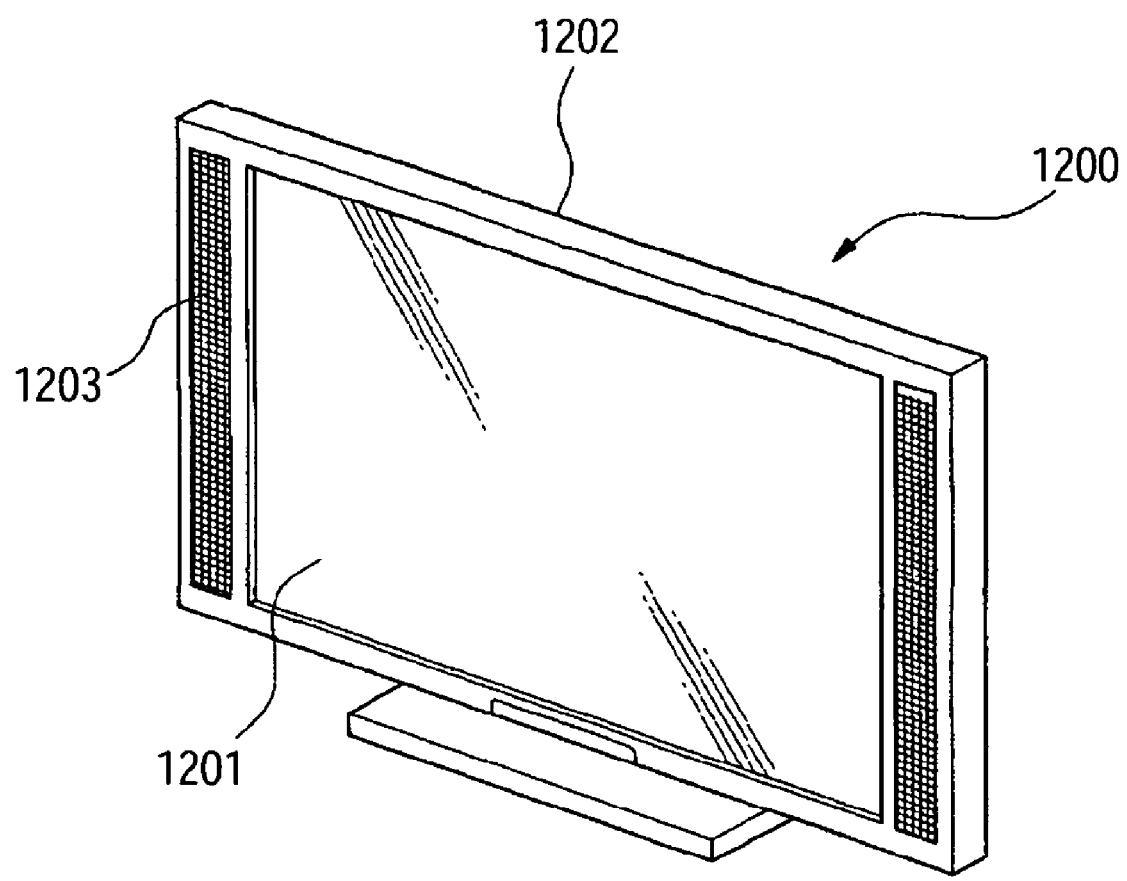
FIG. 10 is a perspective view illustrating an embodiment of an electronic apparatus according to the invention.

FIG. 10 is a perspective view illustrating an example of an electronic apparatus according to the invention.

An image monitor 1200 shown in FIG. 10 includes a display unit 1201 having the liquid crystal display device according to the above-described embodiments, a case 1202, a speaker 1203 and the like. The image monitor 1200 can display images with high brightness, high quality and low irregularity by mounting the liquid crystal display device of the above-described embodiments.

The liquid crystal display device of the above-described embodiments may be advantageously employed as an image display unit of portable telephones, electronic books, personal computers, digital still cameras, view-finder-type or monitor-direct-view-type video tape recorders, car navigators, pagers, electronic notes, electronic calculators, word processors, workstations, video phones, POS terminals, apparatuses equipped with touch panels, etc., without being limited to the image monitor, and can display images with high brightness and high quality in any electronic apparatuses.

Next, an example of an electronic apparatus having the liquid crystal display device will be described with reference to FIG. 10. FIG. 10 is a perspective view of a liquid crystal display television. The liquid crystal display device is disposed inside a case of a liquid crystal display television 300.

The liquid crystal display device is applicable to various electronic apparatuses in addition to the liquid crystal display television. For example, the liquid crystal display device is applicable to liquid crystal projectors, personal computers (PCs) having a multimedia function, engineering workstation (EWS), pagers, word processors, televisions, view-finder-type or monitor-direct-view-type video tape recorders, electronic notes, electronic desk calculators, car navigators, POS terminals, apparatuses having touch panels, etc.

The technical scope of the invention is not limited to the above embodiments and includes various modifications and combinations of the above embodiments without departing from the spirit of the invention.

For example, display of primary colors in a primary color display region has been described in the above embodiments. In addition to this, the invention is applicable to display of two (three) sub-pixels 551 in a region indicated by two (three) sub-pixels 551.

In addition, as units for making the reflectance of the reflective regions of sub-pixels 551 having different colors different, it is possible to make the reflectance of the reflective regions of the sub-pixels 551 different by forming the scanning lines 14 and the data lines 527 in the sub-pixels 551.

In addition, as units for making the reflectance of the reflective regions of sub-pixels 551 having different colors different, it is possible to make the reflectance of the reflective regions of the sub-pixels 551 different by forming a spacer for defining a cell gap such that the spacer overlaps the reflective layer 521 of each sub-pixel 551.

In addition, as units for making the reflectance of the reflective regions of sub-pixels 551 having different colors different, it is possible to make the reflectance of the reflective regions of the sub-pixels 551 different by forming a filter that adjusts the amount of light incident into each sub-pixel 551.

In addition, although the colored layers are not provided in the reflective regions in the above embodiments, colored layers having the same color corresponding to the reflective regions, for example, green colored layers may be provided as monochrome gray scale display regions for not black and white display but monochrome gray scale display. In this case, the colored layers having the same color and the colored layers corresponding to the transmissive regions may be simultaneously formed and the colored layers having the same color may be arranged in regions overlapping the reflective regions.

In addition, the reflective layers in the above embodiments may be reflective electrodes.

In addition, it is possible to arrange the colored layers in a portion of the reflective regions within a range in which the black and white display or the monochrome gray scale display are not substantially affected.

In addition, although the liquid crystal display device using the TFD elements as active elements has been exemplified in the above embodiments, the invention is applicable to a liquid crystal display device using TFT elements as the active elements. In addition, the invention is applicable to a liquid crystal display device of a transverse electric field driving type.

Further, although the colored layers correspond to red (R), green (G), and blue (B) in the above embodiments, the colored layers may correspond to, for example, yellow, cyan, magenta or the like, instead of red (R), green (G), and blue (B).

What is claimed is:

1. A liquid crystal display device comprising:
a pair of substrates composed of a first substrate and a second substrate, which are disposed opposite to each other with a liquid crystal layer interposed therebetween;
a pixel including a plurality of sub-pixels;
reflectors provided in between the second substrate and the liquid crystal layer and that reflect incident light from the first substrate side, the reflectors arranged in a row direction and in a column direction, each reflector having two opposite terminal ends that are parallel to the row direction and that are perpendicular to the column direction, each opposite terminal end of each reflector being out of alignment in the row direction with the opposite terminal ends of adjacent reflectors;
a color filter including red, green, and blue colored layers in a completely non-overlapping condition with the reflectors in plan view; and
a reflective region and a transmissive region provided in each of the sub-pixels, the reflective region of each sub-pixel being in a non-overlapping condition with the color filter for black and white gray-scale display or monochrome gray-scale display, the transmissive region of each sub-pixel being in an overlapping condition with the color filter for color display in the pixel.

2. The liquid crystal display device according to claim 1, wherein an area of the reflective region of each sub-pixel is different for each of the sub-pixels having different colors.

3. The liquid crystal display device according to claim 2, wherein a light shielding portion overlaps the reflective region of each sub-pixel, and an area of the reflective region is different for each sub-pixel due to an area of the light shielding portion being set to be different for each sub-pixel.

4. The liquid crystal display device according to claim 3, wherein the light shielding portion is composed of a light shielding film provided between the sub-pixels or is composed of a wiring line.

5. The liquid crystal display device according to claim 1, wherein the colored layers have different colors corresponding to red (R), green (G) and blue (B), and the reflectance of the reflective layers of the sub-pixels goes from high to low in the order of a green (G) sub-pixel, a red (R) sub-pixel, and a blue (B) sub-pixel.

6. An electronic apparatus comprising the liquid crystal display device according to claim 1.

* * * * *